United States Patent
Unno

(10) Patent No.: US 8,475,113 B2
(45) Date of Patent: Jul. 2, 2013

(54) HYDROELECTRIC POWER DEVICE

(75) Inventor: Yuji Unno, Tokyo (JP)

(73) Assignee: Seabell International Co., Ltd., Tokyo (JP)

( * ) Notice: Subject to any disclaimer, the term of this patent is extended or adjusted under 35 U.S.C. 154(b) by 892 days.

(21) Appl. No.: 12/444,782

(22) PCT Filed: Apr. 4, 2008

(86) PCT No.: PCT/JP2008/056763
§ 371 (c)(1),
(2), (4) Date: Nov. 10, 2009

(87) PCT Pub. No.: WO2008/126786
PCT Pub. Date: Oct. 23, 2008

(65) Prior Publication Data
US 2010/0084862 A1    Apr. 8, 2010

(30) Foreign Application Priority Data

Apr. 6, 2007  (JP) .................................. 2007-101030

(51) Int. Cl.
*F03B 13/12* (2006.01)
(52) U.S. Cl.
USPC ................. 415/3.1; 415/7; 415/221; 415/906
(58) Field of Classification Search
USPC ................. 415/3.1, 4.1, 4.2, 4.4, 221, 7, 220, 415/219.1, 906; 416/231 R, DIG. 9; 290/42, 290/43
See application file for complete search history.

(56) References Cited

U.S. PATENT DOCUMENTS

| | | | |
|---|---|---|---|
| 171,962 A * | 1/1876 | Stephens et al. | 415/4.1 |
| 3,807,890 A | 4/1974 | Wright | |
| 4,335,319 A * | 6/1982 | Mettersheimer, Jr. | 290/54 |
| 5,246,342 A * | 9/1993 | Bergstein | 416/197 A |
| 6,109,863 A * | 8/2000 | Milliken | 415/1 |
| 6,354,804 B1 * | 3/2002 | Leung | 416/231 R |
| 2005/0286996 A1 * | 12/2005 | Tsai | 415/4.2 |

FOREIGN PATENT DOCUMENTS

| | | |
|---|---|---|
| GB | 1573334 A | 8/1980 |
| JP | 26-2410 Y1 | 3/1951 |
| JP | 59141773 A | 8/1984 |
| JP | 9-256941 A | 9/1997 |
| JP | 2002-213339 A | 7/2002 |
| JP | 2002-544419 A | 12/2002 |

(Continued)

OTHER PUBLICATIONS

English Language Abstract for JP2002-544419.

(Continued)

*Primary Examiner* — Dwayne J White
(74) *Attorney, Agent, or Firm* — Norris McLaughlin & Marcus, P.A.

(57) ABSTRACT

A hydroelectric power device equipped with a casing member that has a channel that passes through from an opening on the water entry side towards an opening on the water discharge side, a rotor having a plurality of blades that are integrally fixed respective to the rotating shaft and are disposed inside the channel of the casing member, and a tapered portion, that is provided on the opening on the water entry side of the casing, and that is formed such that the cross-sectional area of the tapered portion is gradually decreased towards the downstream side.

11 Claims, 24 Drawing Sheets

FOREIGN PATENT DOCUMENTS

| | | | |
|---|---|---|---|
| JP | 2003-106247 | A | 4/2003 |
| NL | 7704977 | A | 11/1977 |
| WO | 0028210 | A1 | 5/2000 |
| WO | 2005035977 | A1 | 4/2005 |

OTHER PUBLICATIONS

English Language Abstract for JP2002-213339.
English Language Abstract for JP2003-106247.
English Language Abstract for JP9-256941.
Davis, Barry V., "Low Head Tidal Power", A Major Source of Energy From the Worlds Ocean, Jul. 27, 1997, pp. 1982-1989, Nova Energy Ltd., Vancouver, B.C., Canada.
Annex to European Search Report for related European Application No. EP 08739869 dated Jul. 21, 2011.
Australian Second Examiner's Report for related Australian Application No. AU 2008239143 dated Sep. 12, 2011.

* cited by examiner

HYDROELECTRIC POWER DEVICE

This application is a 371 application of PCT/JP2008/056763 filed Apr. 4, 2008, which claims priority to the Japanese application 2007-101030 Apr. 6, 2007.

TECHNICAL FIELD

The present invention relates to a hydroelectric power device that is installed on rivers or man-made waterways.

BACKGROUND ART

A hydroelectric power device is known which utilizes a weir in the middle of a waterway to cause water to descend and generate a small amount of hydroelectric power from this descent (for example, see Patent Document 1).

This prior art hydroelectric power device is made by providing an L-shaped draft tube inside the waterway on the upstream side of the weir plate. A waterwheel is installed in the draft tube such that the waterwheel is rotated by the water flow inside the draft tube, and a generator is driven by the waterwheel.

Patent Document 1: Unexamined Japanese Patent Bulletin No. H11[1999]-30179

DISCLOSURE OF THE INVENTION

Problem to be Solved by the Invention

Such a device requires the installation of special equipment in addition to a waterwheel, such as the above-mentioned weir plate and/or draft tube, to cause elevation changes in the middle of the waterway for power generation.

Accordingly, there is a need for a hydroelectric power device that can carry out hydroelectric power generation efficiently, with a relatively small water flow, and without requiring a descent of water and the equipment necessary to create one.

Means for Solving the Problem

The present invention meets the above-described need by providing a hydroelectric power device equipped with a casing member that is submerged in a waterway. The casing member has a water path formed by a channel which passes from an opening on the water entry side to an opening on the water discharge side of the casing member being submerged in water. A rotating shaft is located vertically within the casing member and passing though the channel, wherein the upper end of the rotating shaft protrudes through the upper surface of the casing member and above the surface of the water. A rotor with a plurality of rotor blades or vanes is disposed on the rotating shaft. A generator is in mechanical communication with the top end of the rotating shaft. The channel includes a tapered portion, beginning upstream of the shaft location, wherein the cross sectional area gradually decreases from the upstream side of the tapered portion to the downstream side of the tapered portion, thus accelerating the water as it flows through.

That is, in the present invention, the increased flow rate caused by the configuration of the tapered portion of the channel drives the rotors and generators with more energy. This allows more efficient power generation even at moderate water flow rates.

Effect of the Invention

Therefore, according to the present invention, it is possible to provide a hydroelectric power device that can carry out hydroelectric power generation efficiently with a relatively small water flow, and without requiring a descent of water.

BEST MODE FOR CARRYING OUT THE INVENTION

A best mode for carrying out the present invention will be described below in detailed referring to the accompanying drawings.

First Embodiment

Figure 1:
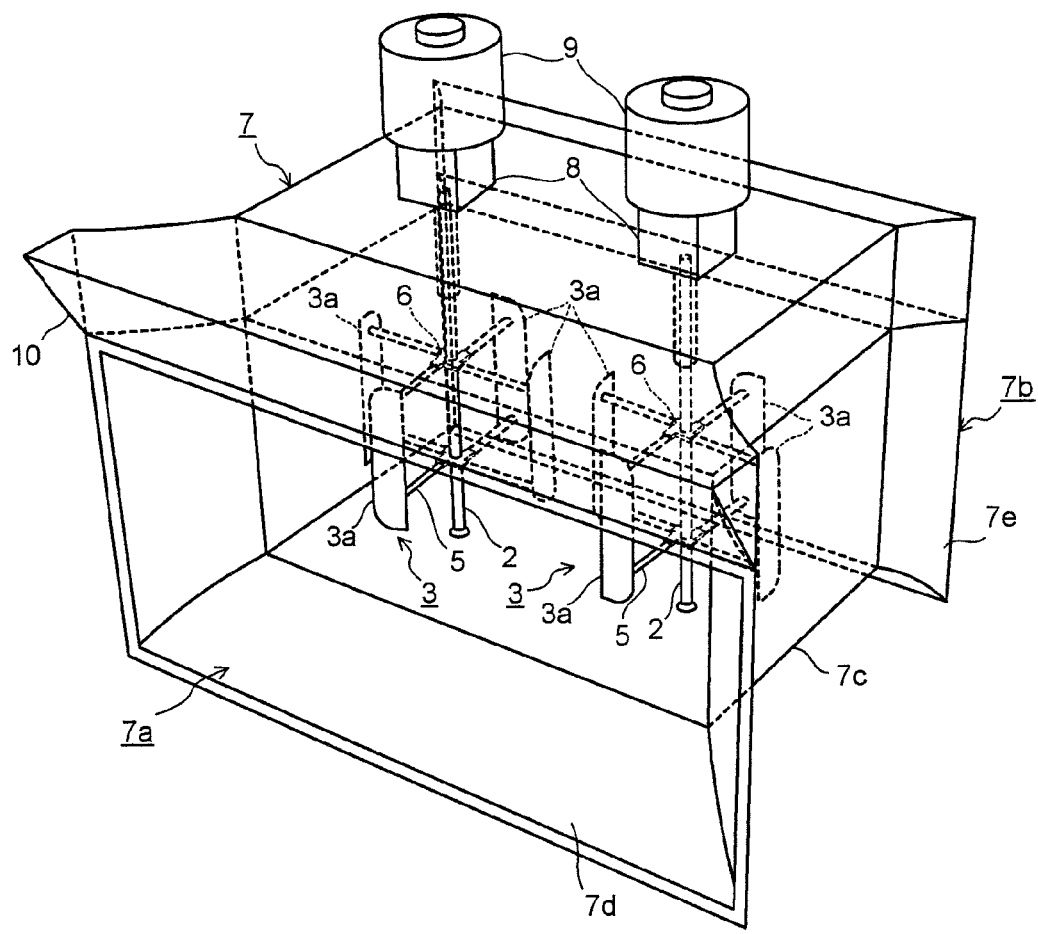
FIG. 1 is an oblique view of a hydroelectric power device according to the first embodiment of the present invention.
Figure 2:
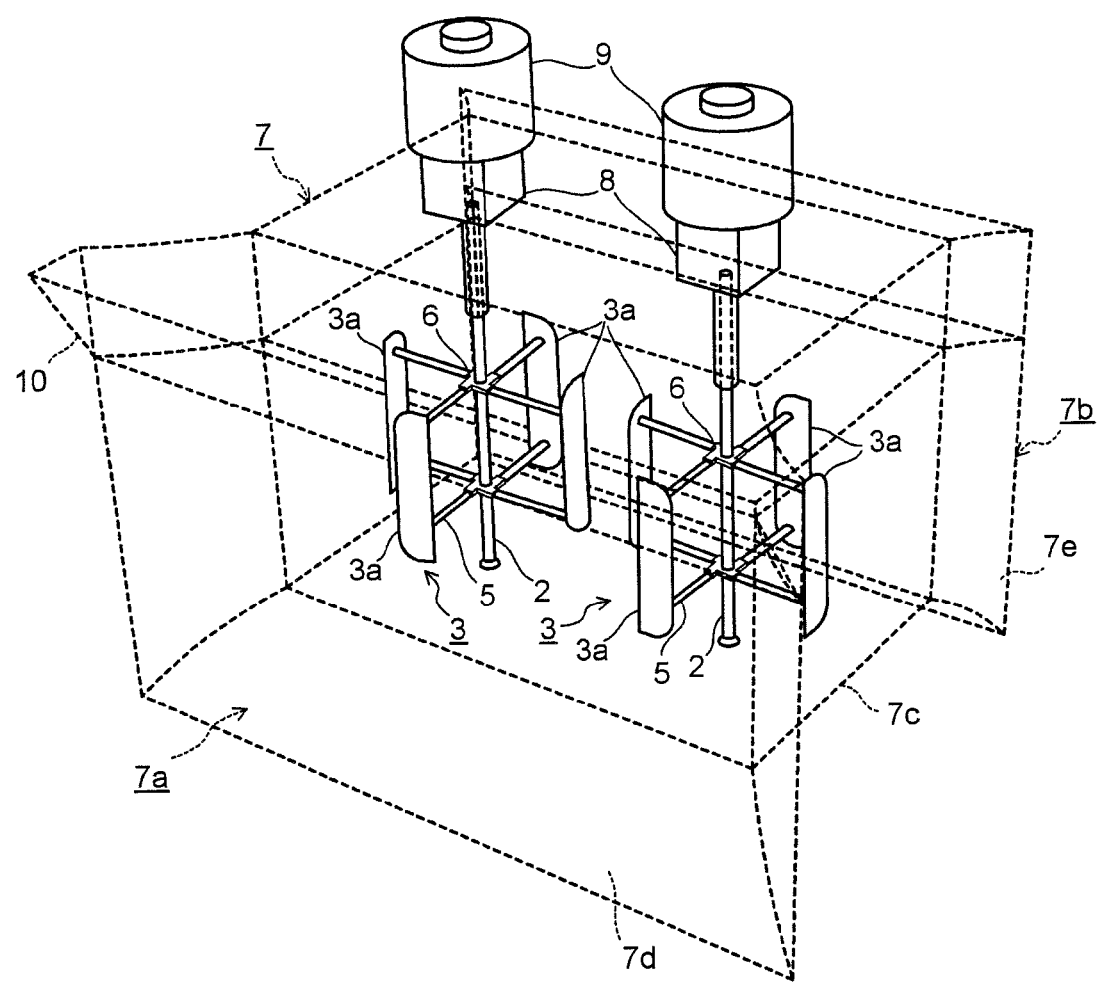
FIG. 2 is a perspective view of the hydroelectric power device shown in FIG. 1.
Figure 3:
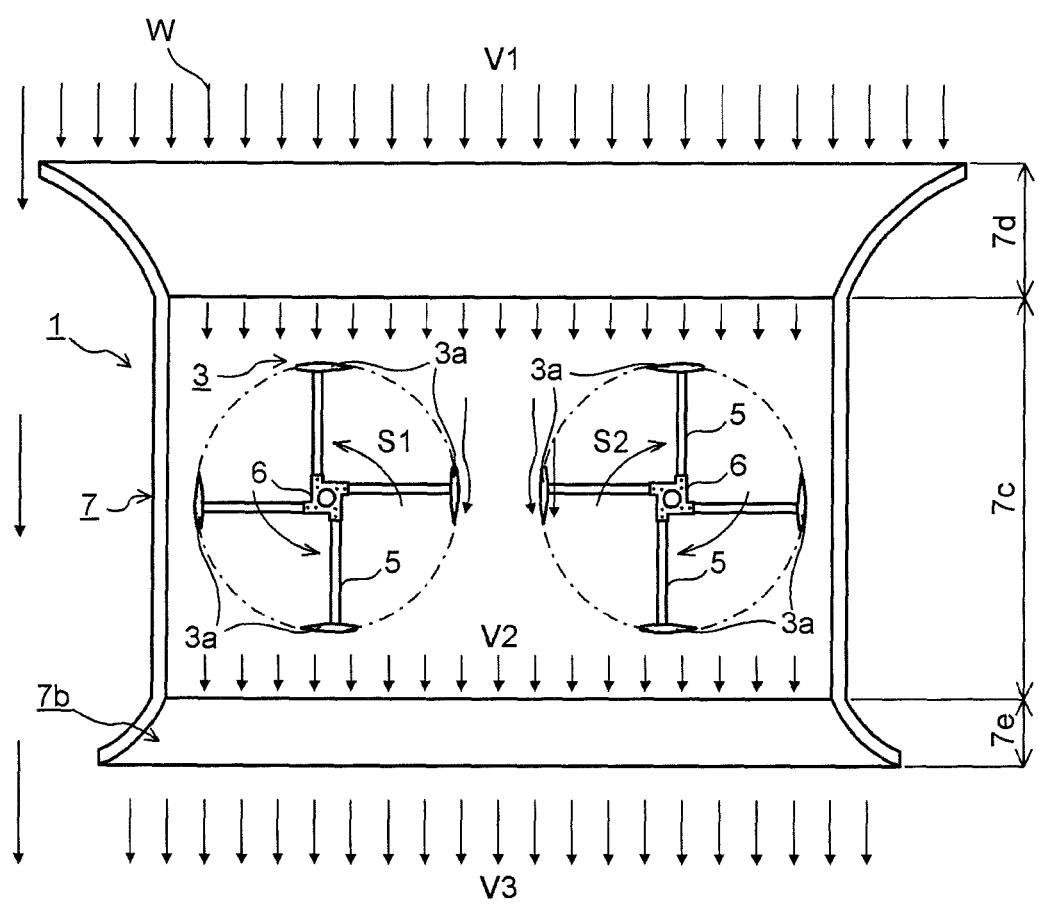
FIG. 3 is a sectional plan view of the hydroelectric power device, as seen from the horizontal direction, shown in FIG. 1.
Figure 4:
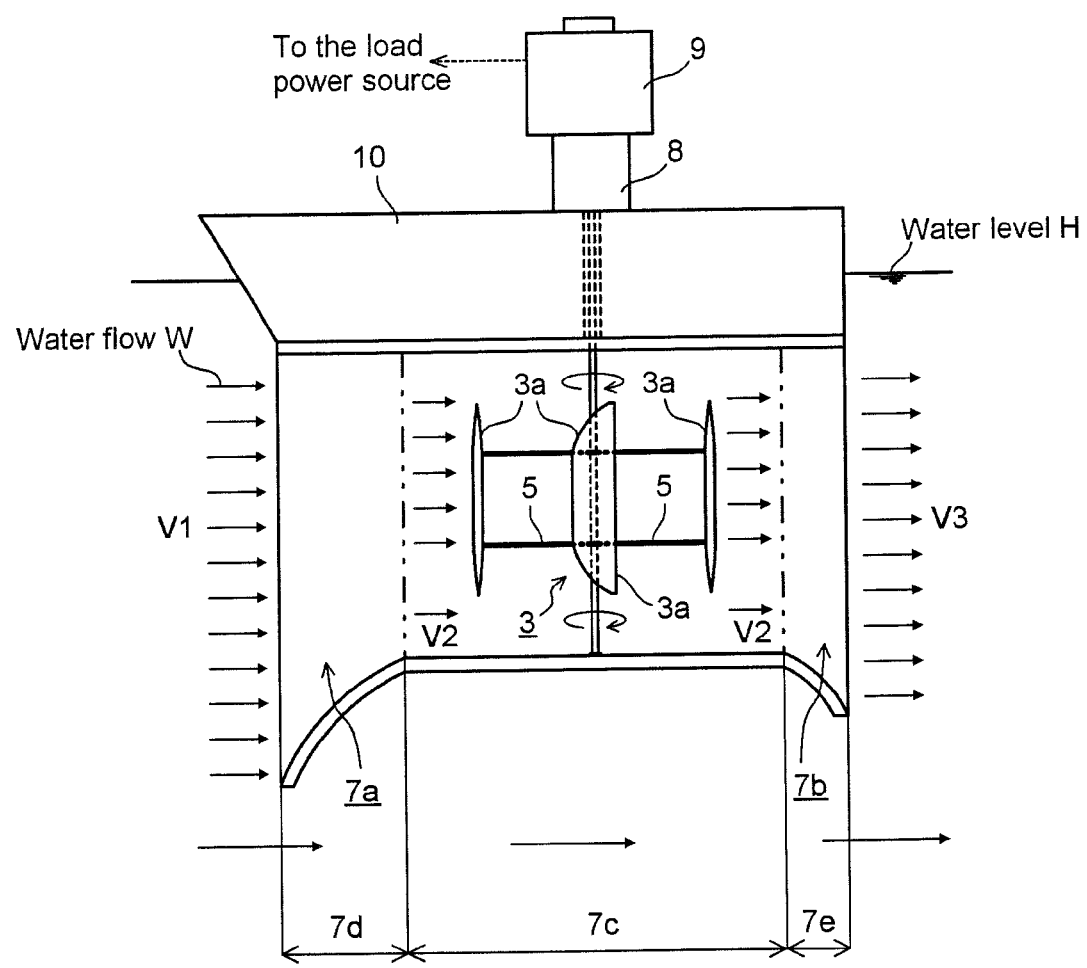
FIG. 4 is a sectional side view of the hydroelectric power device as seen from the side direction, shown in FIG. 1.
Figure 5:
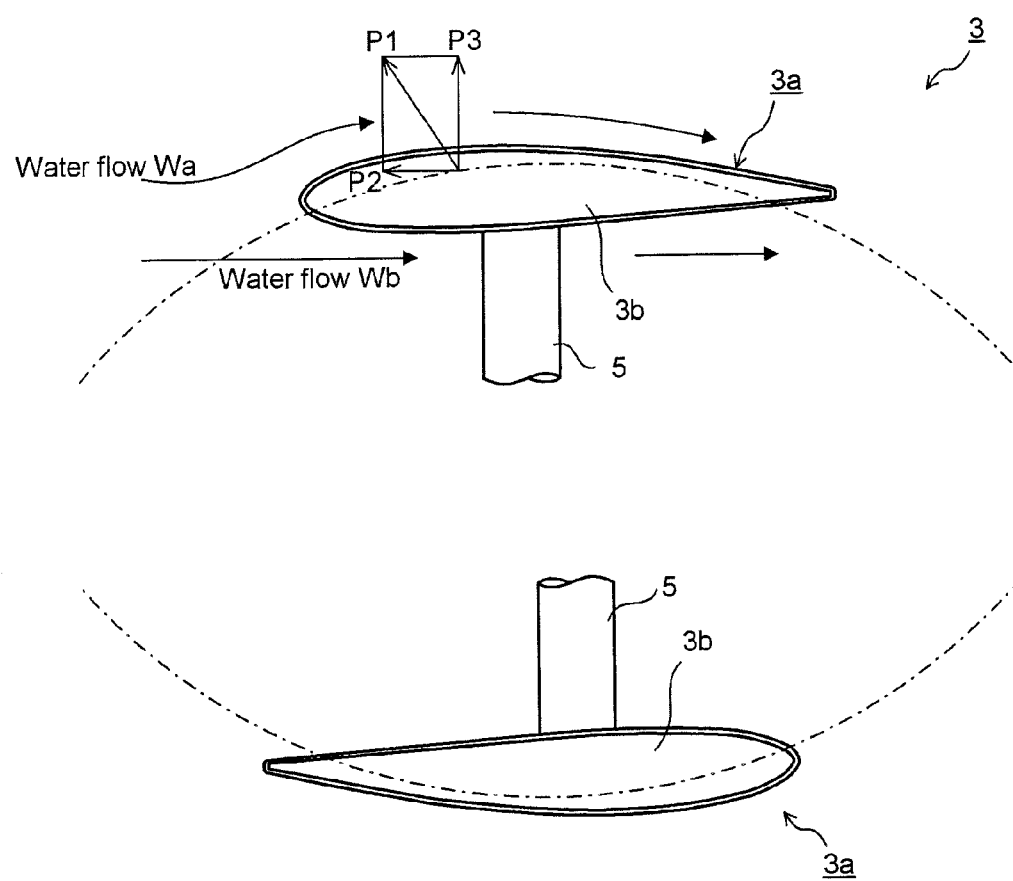
FIG. 5 is a detail showing the action generated on rotor blades within the hydroelectric power device shown in FIG. 1.
Figure 6:
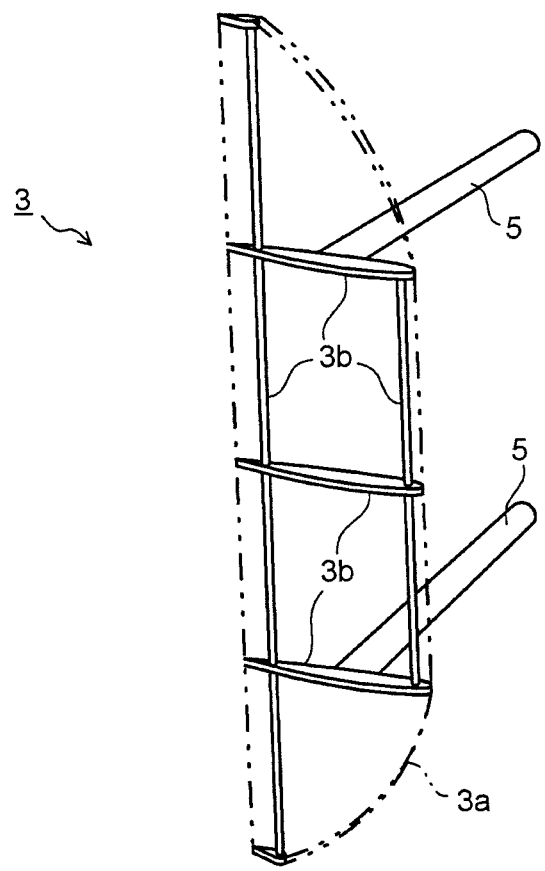
FIG. 6 is a perspective view of a blade showing the inner structure.
Figure 7:
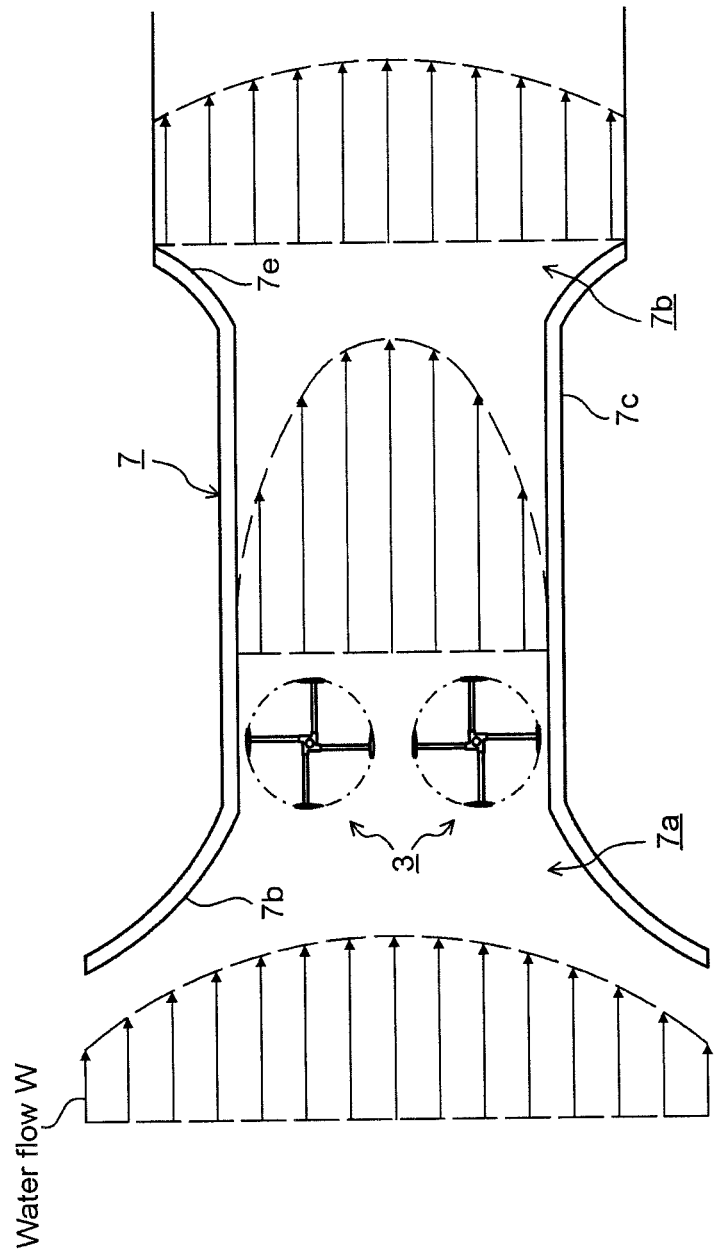
FIG. 7 is a section view, perpendicular to the rotating shafts, showing the relationship between the rotors and the flow of water through the casing member shown in FIG. 1.
Figure 8:
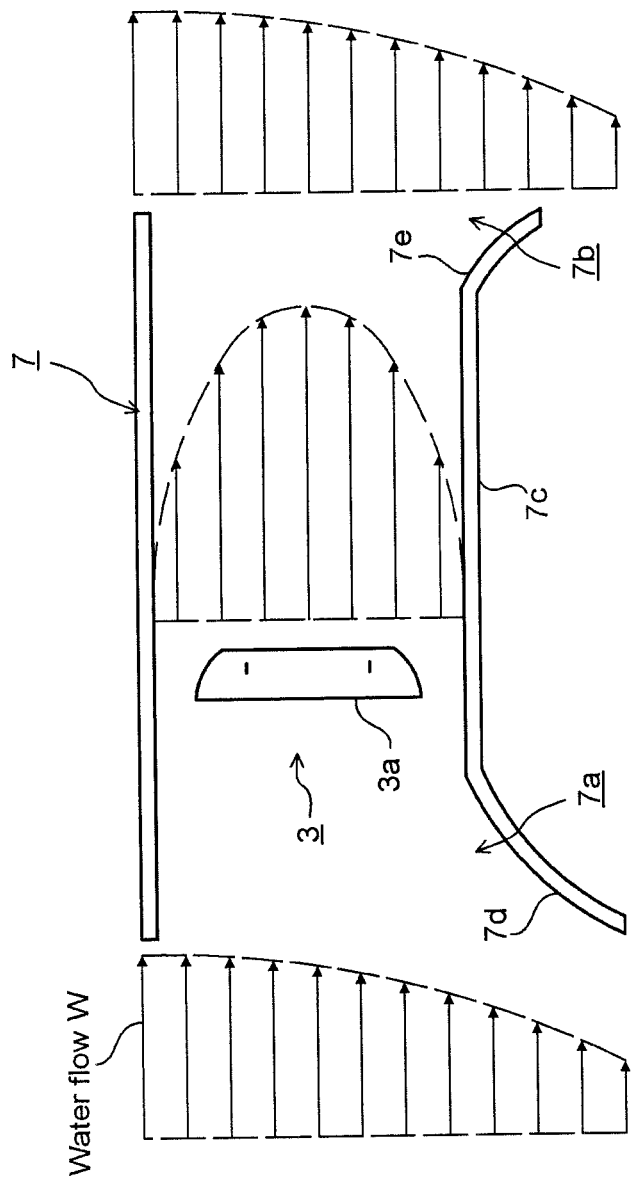
FIG. 8 is a side view section showing the relationship between a rotor blade and the flow of water through the casing member shown in FIG. 1.

FIG. 1 is an oblique view of a hydroelectric power device 1 according to the First Embodiment of the present invention and FIG. 2 is a perspective view of the hydroelectric power device 1. FIG. 3 is a sectional plan view of the hydroelectric power device 1 and FIG. 4 is a sectional side view, as seen from the side direction, of the hydroelectric power device 1. Further, FIG. 5 is a detail showing the action generated on a blade 3a of rotor blades 3 within the hydroelectric power device 1 and FIG. 6 is a perspective view of the blade 3a showing the inner structure thereof. FIG. 7 is a section view showing the relationship between the rotors 3 and the flow of water in a channel 7c through the casing member 7 and FIG. 8 is a side view section showing the relationship between a rotor blade 3 and the flow of water in the water depth direction of the water path 7c in the casing member 7.

In the embodiment shown in FIGS. 1-4, the hydroelectric power device 1 is a perpendicular shaft-type small hydroelectric power generating device that carries out power generation by utilizing water which flows in a substantially horizontal direction, such as a river or sewer, and is chiefly composed of a casing member 7, rotating shaft 2 and rotor 3, a transmission 8, a power generator 9, and a float 10.

As shown in FIGS. 1-4, the casing member 7 has a water path 7c that is formed with a channel that passes through from a water inlet opening 7a on the water entry side towards a water outlet opening 7b on the water discharge side. The casing member 7 is immersed in water in which a flow is occurring and employed. A rotating shaft 2 is arranged in the channel 7c of the casing member 7 such that the axis of the shaft is substantially vertical. The rotating shaft 2 is configured such that the end of the shaft that will interface with the transmission 8 or the power generator 9 protrudes through the top side of the casing member 7 and resides above the surface of the water.

In addition, a rotor 3 is affixed to the rotating shaft 2 and positioned such that the rotor is in the water path 7c of the casing member 7. The rotor 3 may be comprised of a plurality of blades 3a which are connected to a hub 6 by spokes 5 arranged around the hub 6 in a radial direction. The blades 3a and spokes 5 are distributed evenly around the circumference of the hub 6 and the hub 6 is affixed to the rotating shaft 2. In addition, each of the blades 3a may be formed in a airfoil shape such that a lifting force is generated by the water flow that passes over the blade surfaces.

A power generator 9 may be connected through a transmission 8 to one end of each of the rotating shaft 2 on which the rotor 3 is affixed. The transmission 8 may alter the number of rotations of the rotating shaft 2 that rotate together with the rotor 3, and transmits the driving force of the rotating shaft 2 to the power generator 9 to which a load may be connected. A float 10 may be provided in order to cause at least the transmission 8 and power generator 9 to reside above the water surface. The float 10 may be hollow or constructed of a buoyant material. In other words, the float 10 is provide for fixing a construction that is installed on a bank of rivers or waterways or another structure that floats on the water surface.

In addition, as shown in FIGS. 1-4, a portion of the channel 7c, located upstream of the rotating shaft 2, may be tapered ("tapered portion" 7d) such that the cross sectional area of the water path in the tapered portion gradually decreases towards the downstream side. In other words, by narrowing the flow path, this tapered portion 7d causes the water entry velocity, V1, to increase to the velocity, V2, while minimizing the head loss due to Bernoulli's principle—stating that the pressure of the flow will be lower where the velocity is V2.

In addition, a portion of the channel 7c, located downstream of the rotating shafts 2, may be diverging ("diverging portion" 7e) such that the cross sectional area of the water path in the diverging portion 7e gradually increases toward the downstream side. In other words, by widening the flow path, this diverging portion 7e inhibits the occurrence of turbulence that can occur in the area around the water outlet opening 7b, by creating a smooth water discharge when lowering the flow velocity V2 of the water to the flow velocity V3 and reducing head loss by this inhibiting this turbulence.

As shown in FIGS. 5 and 6, the rotor 3 may have blades 3a with an airfoil shape. As shown in FIG. 6, the shape of the surface is composed due to the fact that the blades 3a cover the frame 3b made of FRP from the outside with an aluminum alloy plate, etc. As shown in FIGS. 5 and 7, when a water flow W reaches a blade, the water is separated into water flows Wa and Wb which pass over the outside and the inside of the blade, respectively. Lift force P1 is generated due to the difference in path lengths as each of the water flows Wa and Wb pass over the blade surfaces. Lift force P1 has components in the tangential direction, P2, and the normal direction, P3. Tangential force P2 creates a rotational force on the rotor 3 causing the rotor 3 and the rotating shaft 2 to rotate.

As shown in FIG. 3, in this embodiment of the hydroelectric power device 1, the blades 3a are formed in a shape wherein the rotor 3 rotates in the direction where the side of the rotor nearest to the center of the channel rotates into, or against, the flow of water, and the side of the rotor nearest the walls of the channel rotates with the flow of water, S1 and S2.

As shown in FIG. 3, the profile of the trailing edge of blade 3a is sharp, whereas the profile of the leading edge of the blade is blunt. Therefore, as substantially shown in FIGS. 3[, 5, and 7], the resistance to the water is reduced by configuring the rotor 3 such that the water flow meets the trailing edge of the blades 3a near the side of the channel where the flow rate is slow, whereas the water flow meets the leading edge of the blades 3a near the center of the channel where the flow rate is fast creating higher lift forces.

Therefore, as shown in FIGS. 3, 5, and 7, the resistance to the water is reduced by configuring the rotor 3 such that the water flow meets the trailing edge of the blades 3a near the side of the channel where the flow rate is slow, whereas the water flow meets the leading edge of the blades 3a near the center of the channel where the flow rate is fast creating higher lift forces.

Moreover, as shown in FIG. 4 and FIG. 8, in the blades 3a in this mode of embodiment, the sectional area of the blades 3a that receive the water flow from the upstream side at the water surface side or water bottom side in the water depth direction may be formed so it is smaller than the sectional area of the blades 3a that receive the water flow from the upstream side at the center part in the water depth direction thereof, in the water depth direction (depth direction) of the water path 7c of the casing member.

Therefore, as shown in FIG. 4 and FIG. 8, the resistance of the water is reduced by configuring it such that the water flow is received at the place where the sectional area of the blades 3a is small (the narrow place) at the water surface side or water bottom side of the water path 7c whose flow rate is slow, whereas it is possible to rotate the rotors 3 efficiently by obtaining high lift force by configuring it such that the water flow is received at the place where the sectional area of the blades 3a is large (the thick place), at the center part in the water depth direction of the water path 7c whose flow rate is fast.

In this embodiment of the present invention, it is possible to increase the flow rate inside the channel 7c and inhibit the occurrence of turbulence by altering the characteristics of the channel, and moreover to utilize the increased flow rate to more efficiently drive the rotor 3 linked to the power generator 9.

Second Embodiment

Figure 9:
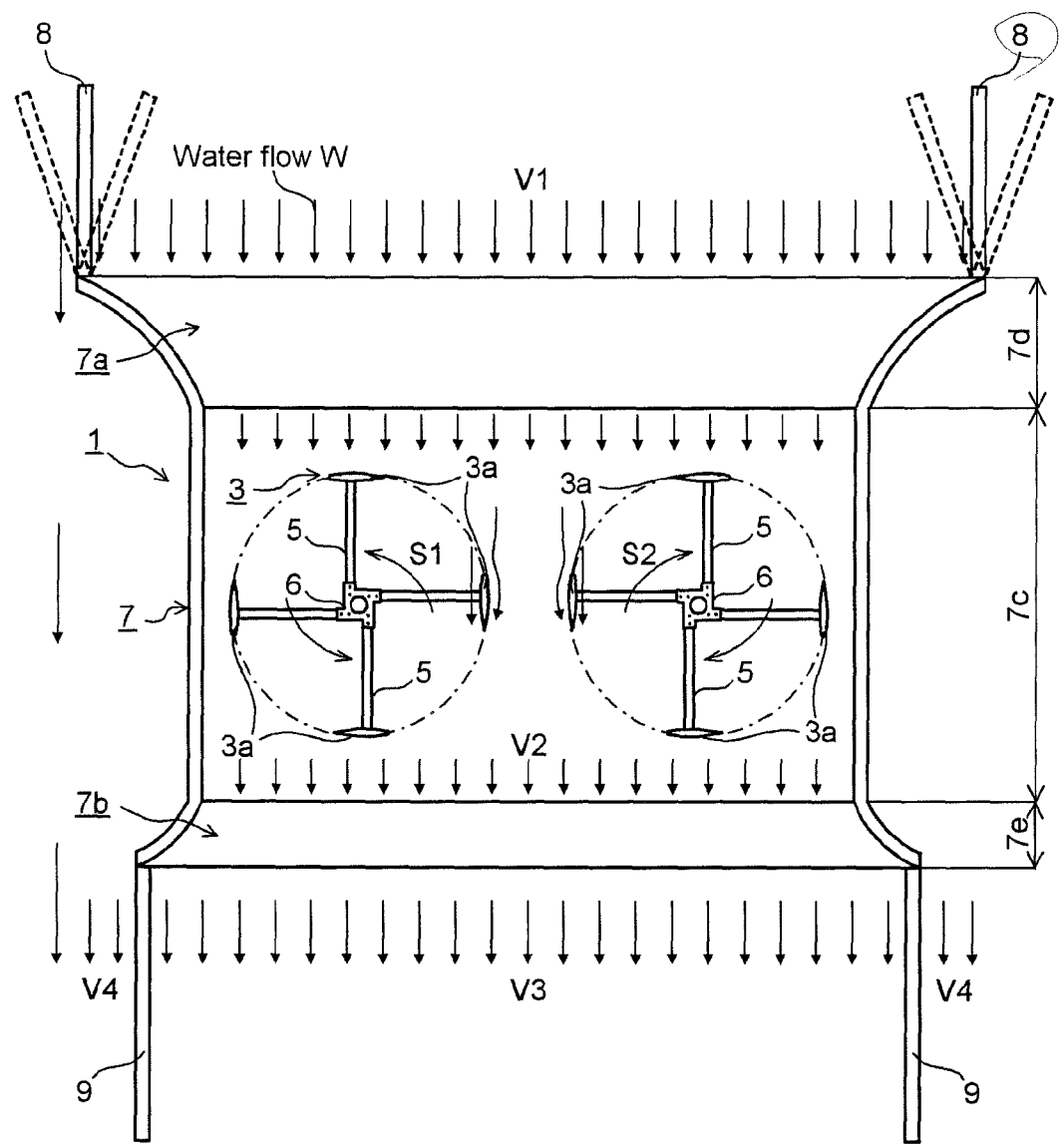
FIG. 9 is a sectional plan view of the second embodiment of the hydroelectric power device, as seen from the horizontal direction, according to the present invention.
Figure 10:
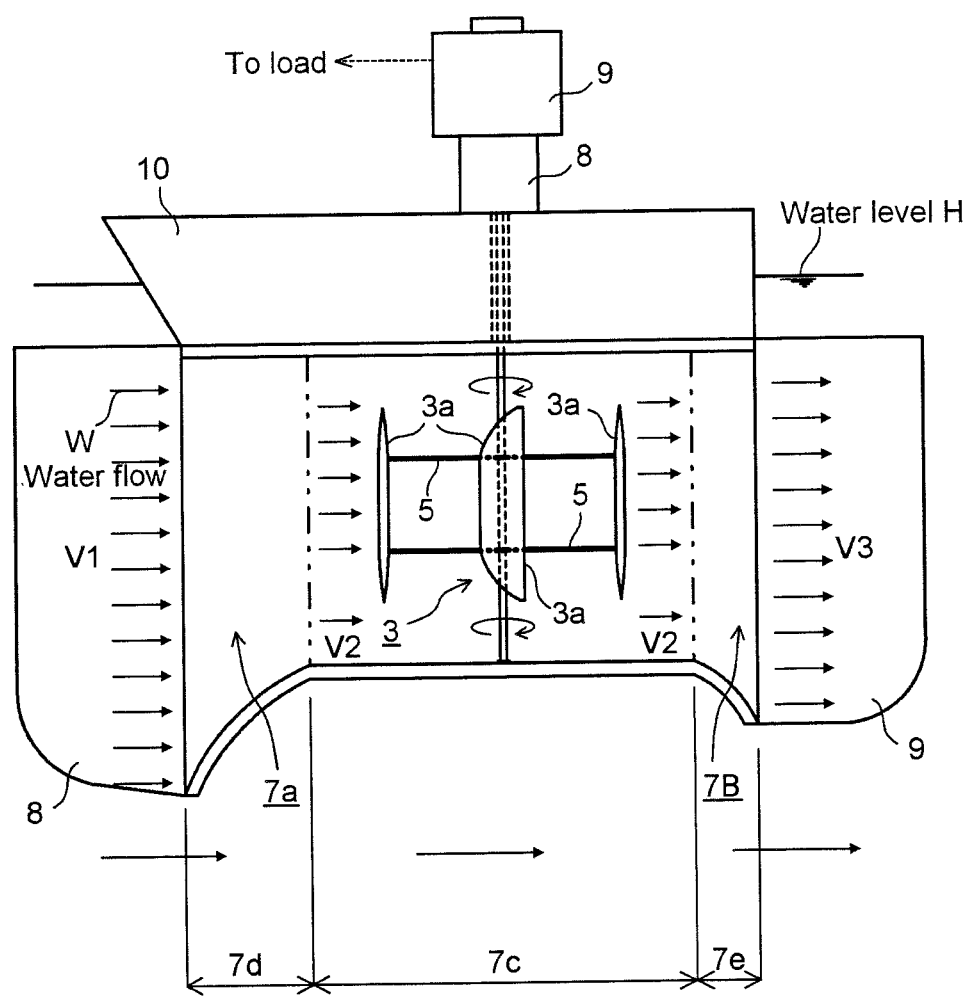
FIG. 10 is a sectional side view of the hydroelectric power device, as seen from the side direction. shown in FIG. 9.

FIGS. 9 and 10 are drawings for the purpose of explaining a second embodiment of the present invention. FIG. 9 corresponds to FIG. 3 of the aforementioned first embodiment and is a cross-sectional view of the hydroelectric power device 1 as seen from the horizontal direction. FIG. 10 corresponds to FIG. 4 of the aforementioned first embodiment and is a cross-sectional view of the hydroelectric power device 1 as seen from the side direction.

This embodiment differs from the first embodiment in that a front water volume adjustment plate 8 is disposed in the water inlet opening 7a in the casing member 7 and a rear adjustment plate 9 is disposed in the water outlet opening 7b in the casing member 7; other constituent elements are the same as in the first embodiment. Accordingly, in this embodiment, the distinguishing characteristics and the effects of operation of the front water volume adjustment plate 8 and the rear adjustment plate 9 are explained.

The front water volume adjustment plate 8 is disposed in the water inlet opening 7a of the casing member 7 freely rotatably with the connecting part of the water inlet opening 7a as its center, such that it changes the degree of opening toward the water inlet side. Accordingly, the volume of water flowing into the casing member 7 can be adjusted by making the degree of opening of the front water volume adjustment plate 8 smaller when the water flow velocity is high and by making the degree of opening of the front water volume adjustment plate 8 larger when the water flow velocity is low.

That is, when the water velocity is high and the user wishes to suppress the volume of water flowing into the casing member 7, the degree of opening of the front water volume adjustment plate 8 is made smaller, and when the when the water velocity is low and the user wishes to increase the volume of water flowing into the casing member 7, the degree of opening of the front water volume adjustment plate 8 is made larger. In this way, the amount of electricity generated by the hydroelectric power device 1 can be suitably adjusted.

Further, because the casing member 7 has a tapered portion 7d, as shown in FIG. 9, the flow velocity V3 of the water at the water outlet opening 7b may become greater than the velocity V4 of the water flowing outside of the casing member 7. Accordingly, when the water flowing inside the casing member 7 and the water flowing outside of the casing member 7 come into direct contact at the water outlet opening 7b, turbulence may be caused by the difference in velocity between the two.

Nevertheless, when a rear adjustment plate 9 is installed in the water outlet opening 7b of the casing member 7 as shown in this embodiment, the water flowing inside the casing member 7 and the water flowing outside of the casing member 7 come into contact after they have passed the rear adjustment plate 9. Accordingly, because they do not come into direct contact at the water outlet opening 7b as described above, generation of turbulence is inhibited even when the velocity V3 of the water at the water outlet opening 7b is greater than the velocity V4 of the water flowing outside of the casing member 7.

Third Embodiment

Figure 11:
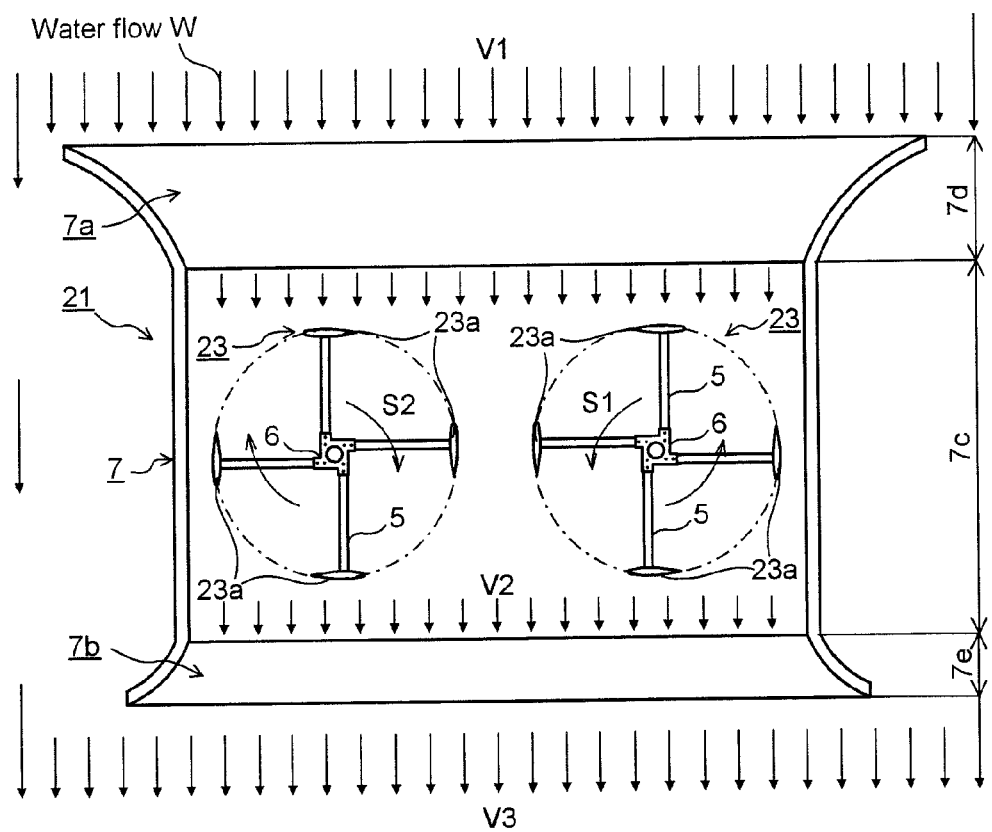
FIG. 11 is a section view of the third embodiment of the hydroelectric power device, as seen from the horizontal direction, according to the present invention.
Figure 12:
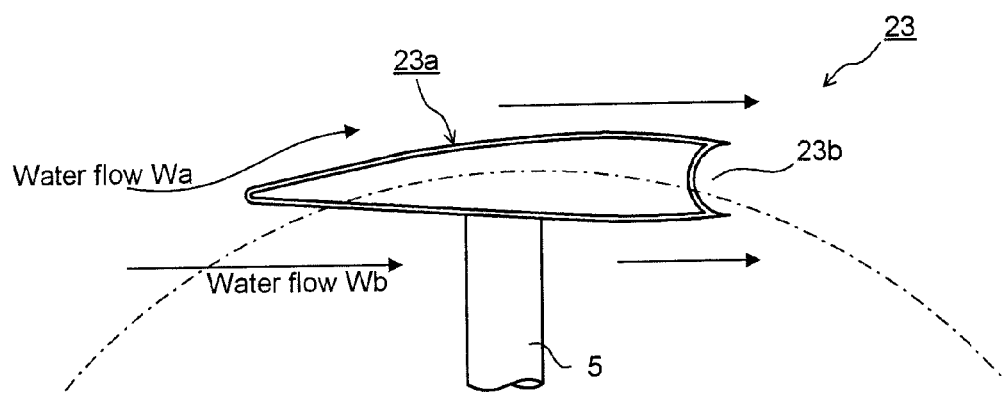
FIG. 12 is a detail showing the action generated on the rotor blade provided on the hydroelectric power device shown in FIG. 11.
Figure 12:
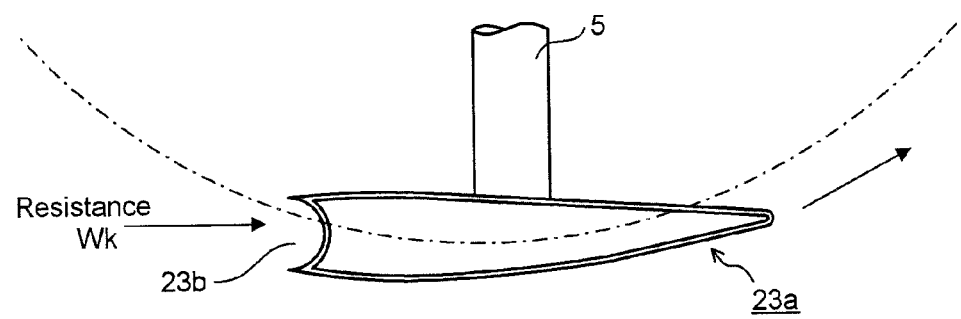
Figure 13:
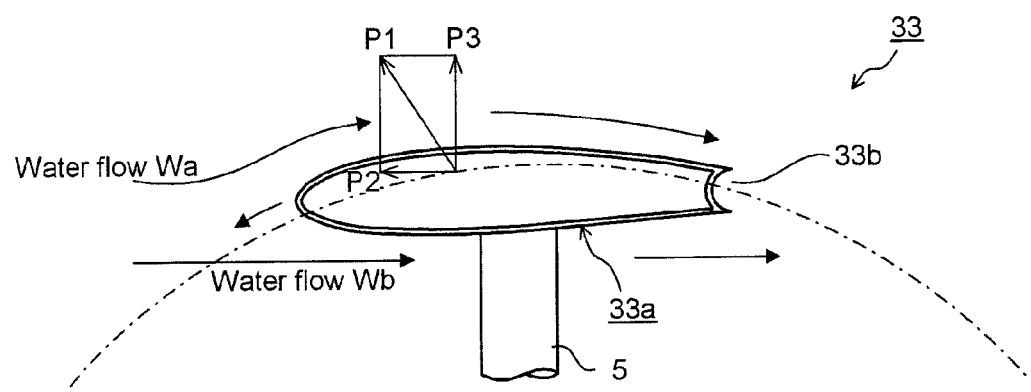
FIG. 13 is a detail showing the action generated on an alternate embodiment of the rotor blade with a different type of rotor blade shown in FIG. 12.
Figure 13:
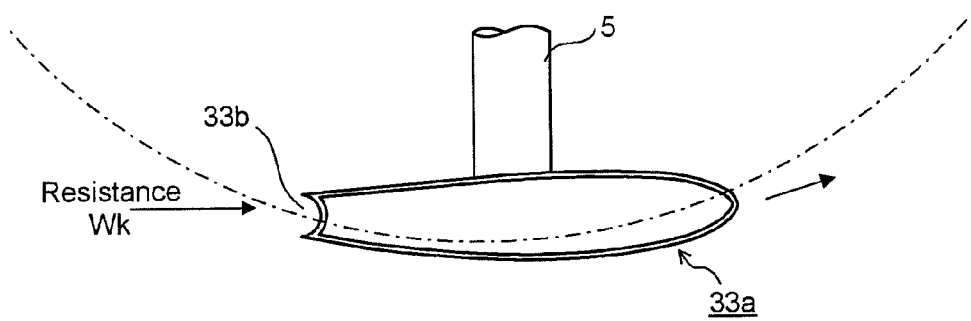
Figure 14:
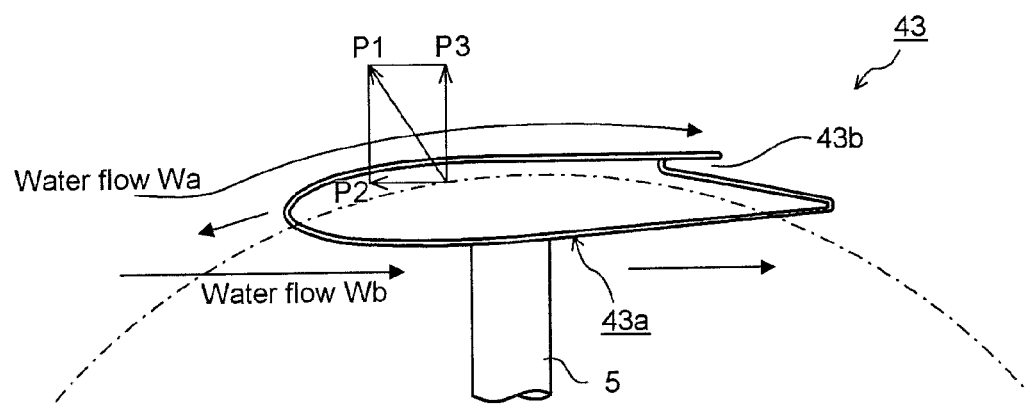
FIG. 14 is a detail showing the action generated on another alternate rotor blade with different types of rotor blade shown in FIGS. 12 and 13.
Figure 14:
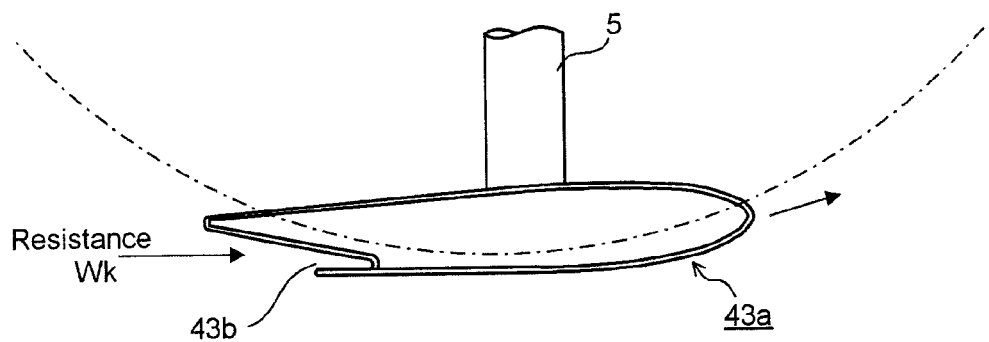
Figure 15:
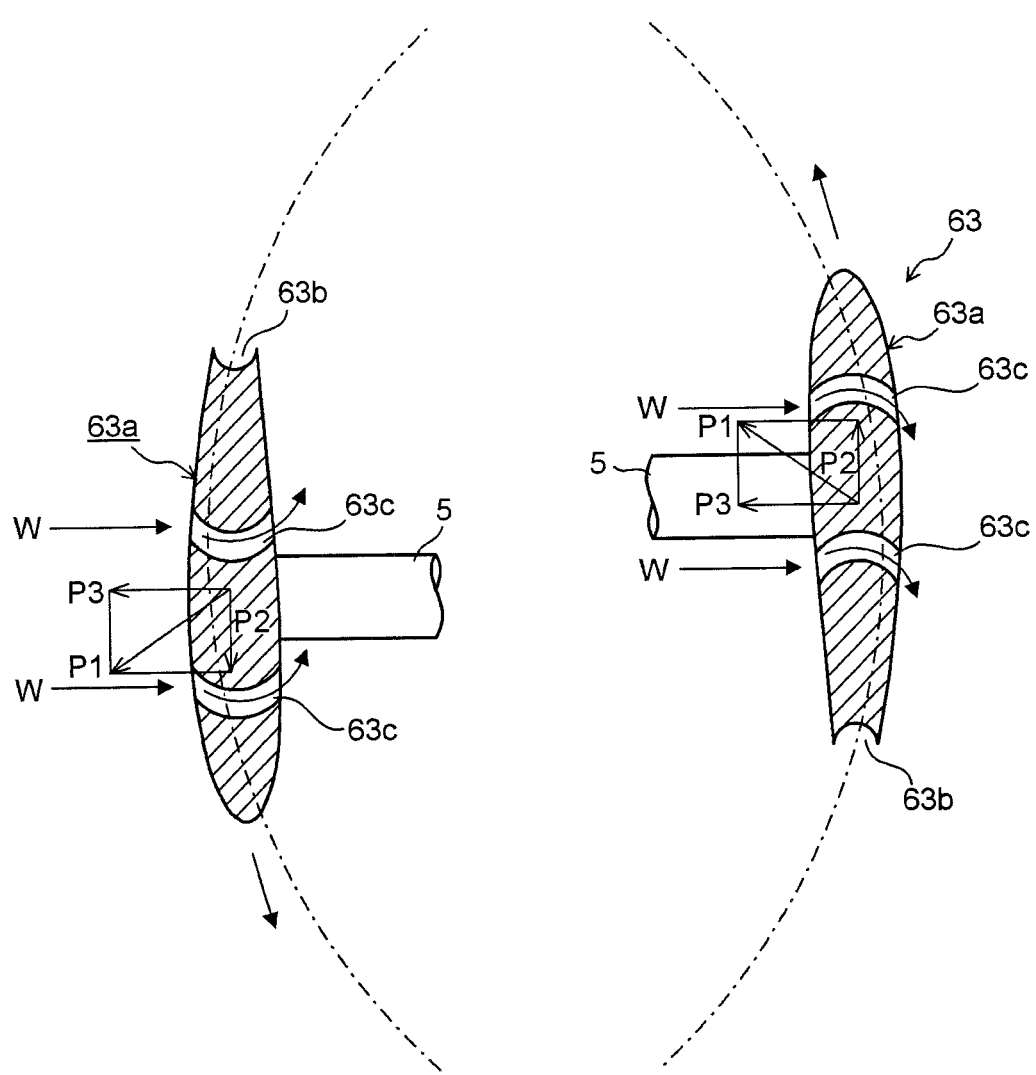
FIG. 15 is a detail showing the action generated on another alternate rotor blade with different types of rotor blade shown in FIGS. 12 to 14.

A third embodiment of the present invention will be described referring to FIGS. 11 to 15. FIG. 11 is a section view of a hydroelectric power device 21, as seen from the side direction, according to the third embodiment of the present application, and FIG. 12 is a plan view showing the action generated on a Savonius-type blade 23a of the rotor blade 23 provided on the hydroelectric power device 1. FIG. 13 is a plan view showing the action generated on a lift-type/Savonius-type blade 33 and FIG. 14 is a plan view showing the action generated on a lift-type/Savonius-type blade 43, a part of which construction differs from the blade 33 of FIG. 13. Furthermore, FIG. 15 is a plan view showing the action generated on a lift-type/Savonius-type blade 63, a part of which construction differs from the respective blades shown in of FIGS. 13 and 14. In FIGS. 11 to 15, note that the same constituent elements as those of the hydroelectric power device 1 according to the first embodiment shown in FIGS. 1 to 8 are denoted with like numerals, and the description thereof is omitted.

FIGS. 11 and 12 show another embodiment of the present invention in which the rotors 23 may be driven by Savonius-type blades 23a which operate by utilizing the resistance of the blade to the flow of water. Blades 23a have a savonius portion (scoop) 23b which increases the blade's resistance to the water flow W. The rotor 23 is rotated by the force of the water acting against this resistance Wk. In the hydroelectric power device 21, shown in FIG. 9, the blades 23a are formed in a shape wherein the rotor 23 rotates in the direction where the side of the rotor nearest to the center of the channel rotates with the flow of water, and the side of the rotor nearest the walls of the channel rotates into, or against, the flow of water, S1 and S2.

The profile of the leading edge of blade 23a is sharp, whereas the profile of the trailing edge of the blade is formed into a scoop 23b, that is, the sectional area of the blades 23a of the rotor that receive the water flow from the upstream side at the edge side of the water path 7c of the casing member 7 in the width direction is smaller than the sectional area of the blades 23a of the rotor that receive the water flow from upstream side at the center part in the above-mentioned width direction.

Therefore, as shown in FIGS. 11 and 12, the resistance to the water is reduced by configuring the rotor 23 such that the water flow meets the leading edge of the blades 23a near the side of the channel where the flow rate is slow, whereas the water flow meets the trailing edge of the blades 23a near the center of the channel where the flow rate is fast creating higher Savonius forces.

FIG. 13 shows another embodiment of the present invention wherein the blades 33a used to drive the rotor 33 are in a combination lift-type/Savonius-type configuration. The blades are generally shaped as airfoils as in the blades 3a shown in FIG. 5. However, the blades 33a have an additional scoop 33b at the trailing edge of the shape. In this way, when the blades 33a are traveling against the flow of water W, they are acted upon by the lifting-force provided by the airfoil shape, and when the blades are traveling with the flow of water, they are acted upon by the resistance of the scoop 33b to the flow of water. FIG. 14 shows another configuration of a combination lift-type/Savonius-type blade 43a wherein the scoop 43b is located on the peripheral surface of the blade. In this case, additional rotational force is caused by the scoop 43b being located further from the center of the rotor 43 causing a higher moment.

FIG. 15 shows another configuration of a combination lift-type/Savonius-type blade 63a wherein the blade includes one or more through holes 63c. The through holes 63c are perforated in a direction that provides motive force for rotating the rotor 63 by a force created when water flows into the through holes 63c and acts on the walls of hole. In this case, in addition to the above-described respective lift force/Savonius-type effects, it is possible to impart motive force on the rotor 63 when water flows through the through hole 63c.

Fourth Embodiment

Figure 16:
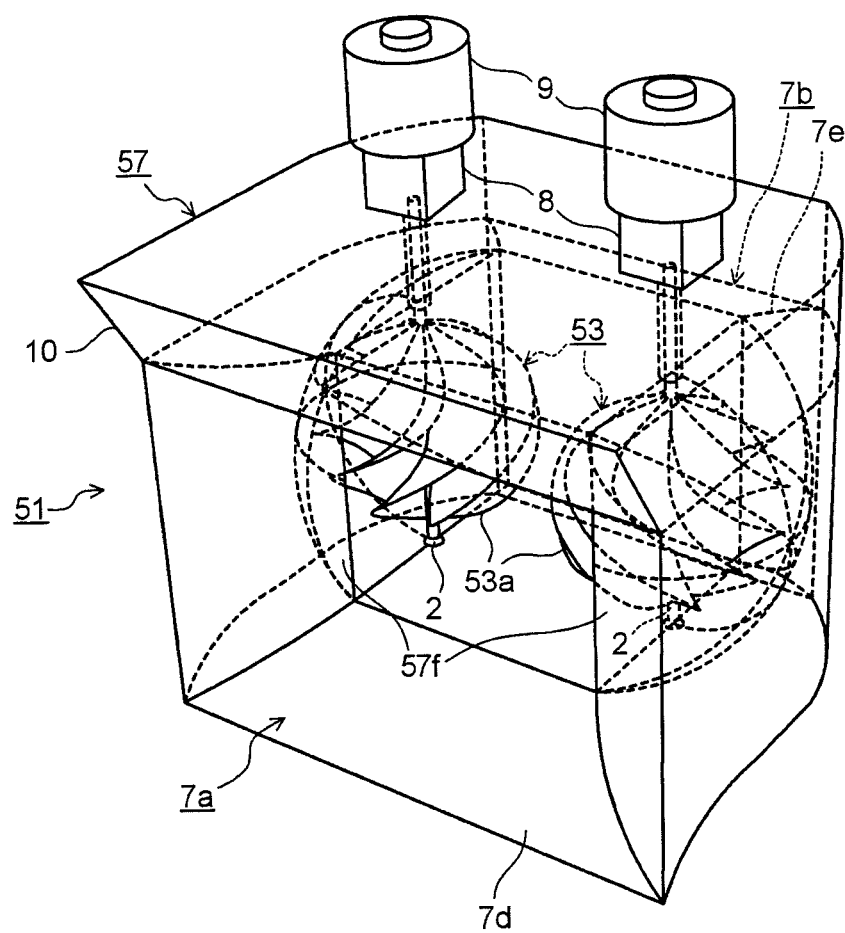
FIG. 16 is an oblique view showing a fourth embodiment of the present invention.
Figure 17:
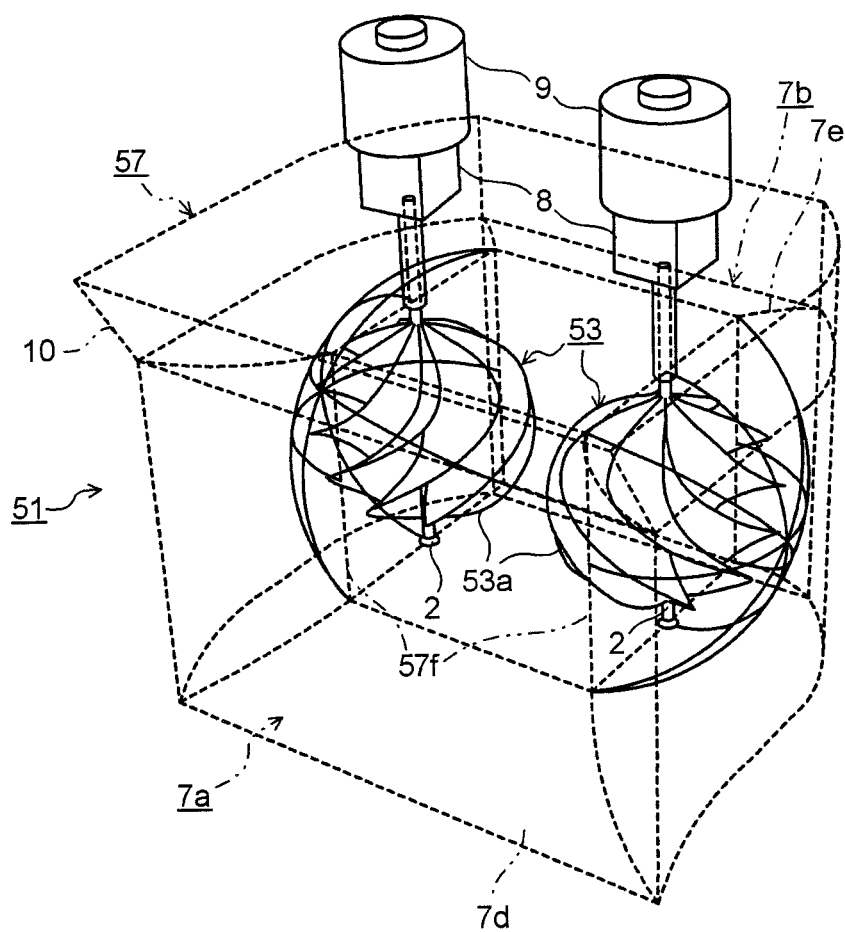
FIG. 17 is a perspective view of the hydroelectric power device shown in FIG. 16.
Figure 18:
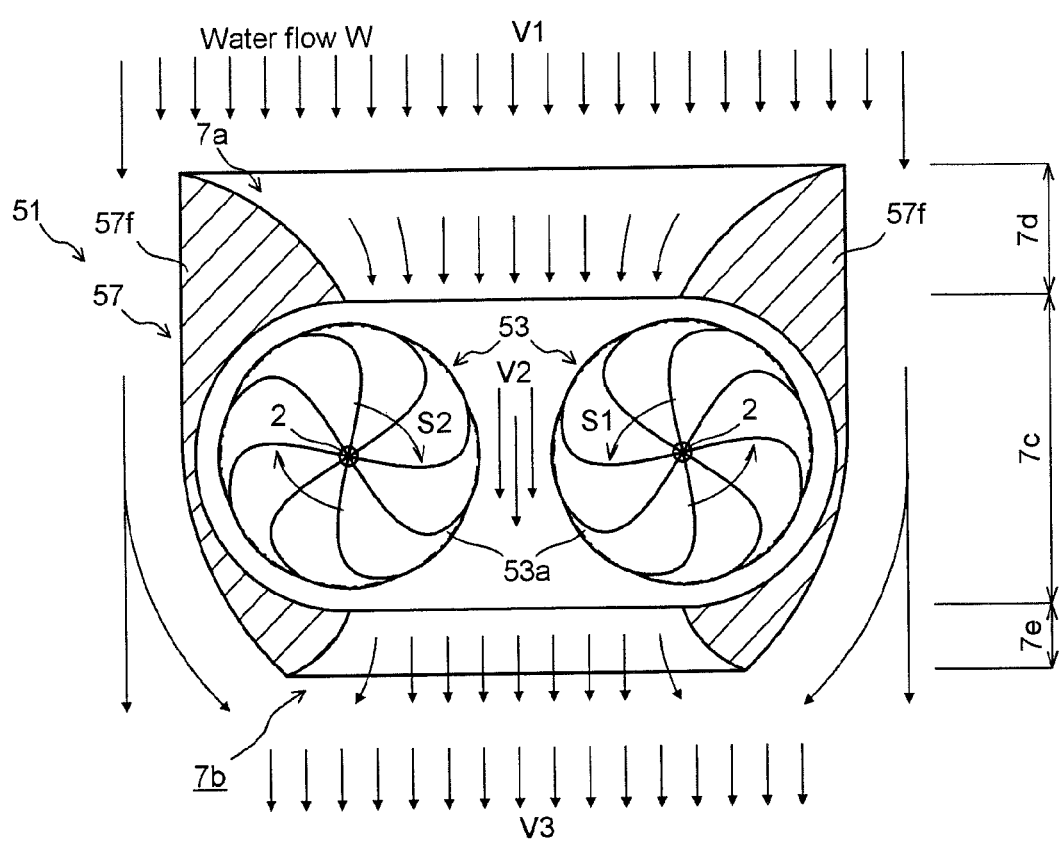
FIG. 18 is a sectional plan view of the hydroelectric power device, as seen from the horizontal direction, shown in FIG. 16.
Figure 19:
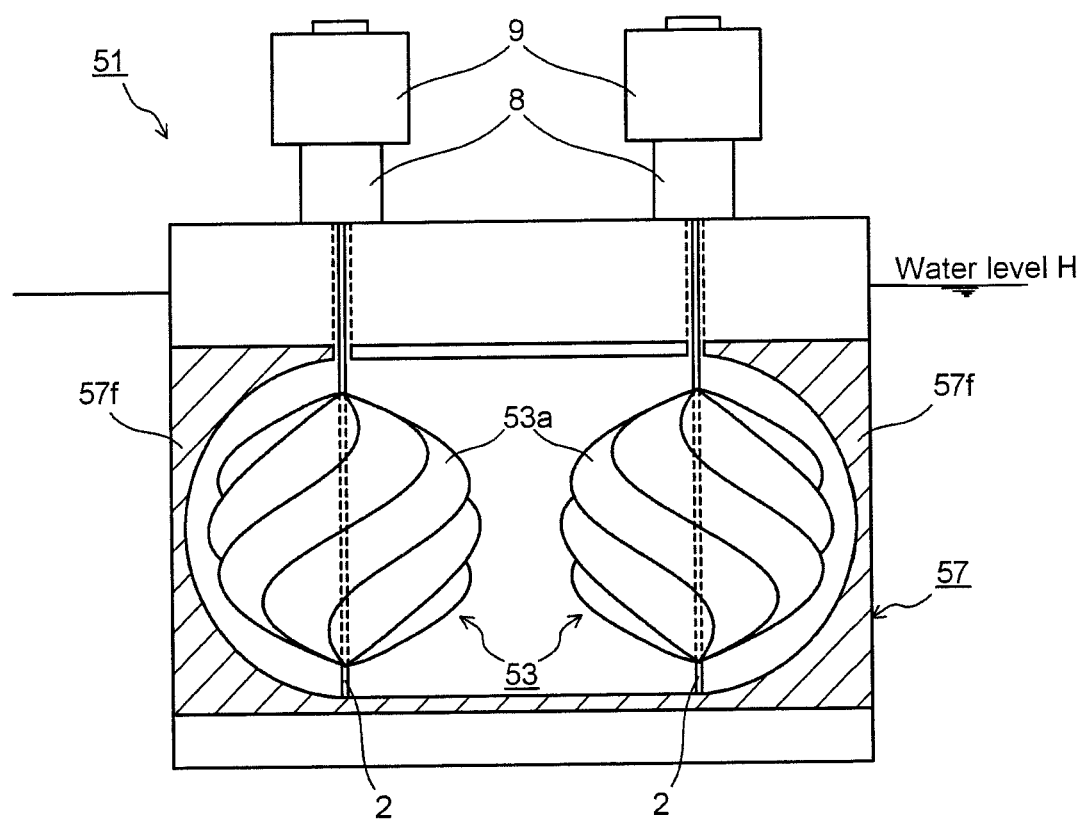
FIG. 19 is a section view, as seen from the water entry direction, of the hydroelectric power device shown in FIG. 16.
Figure 20:
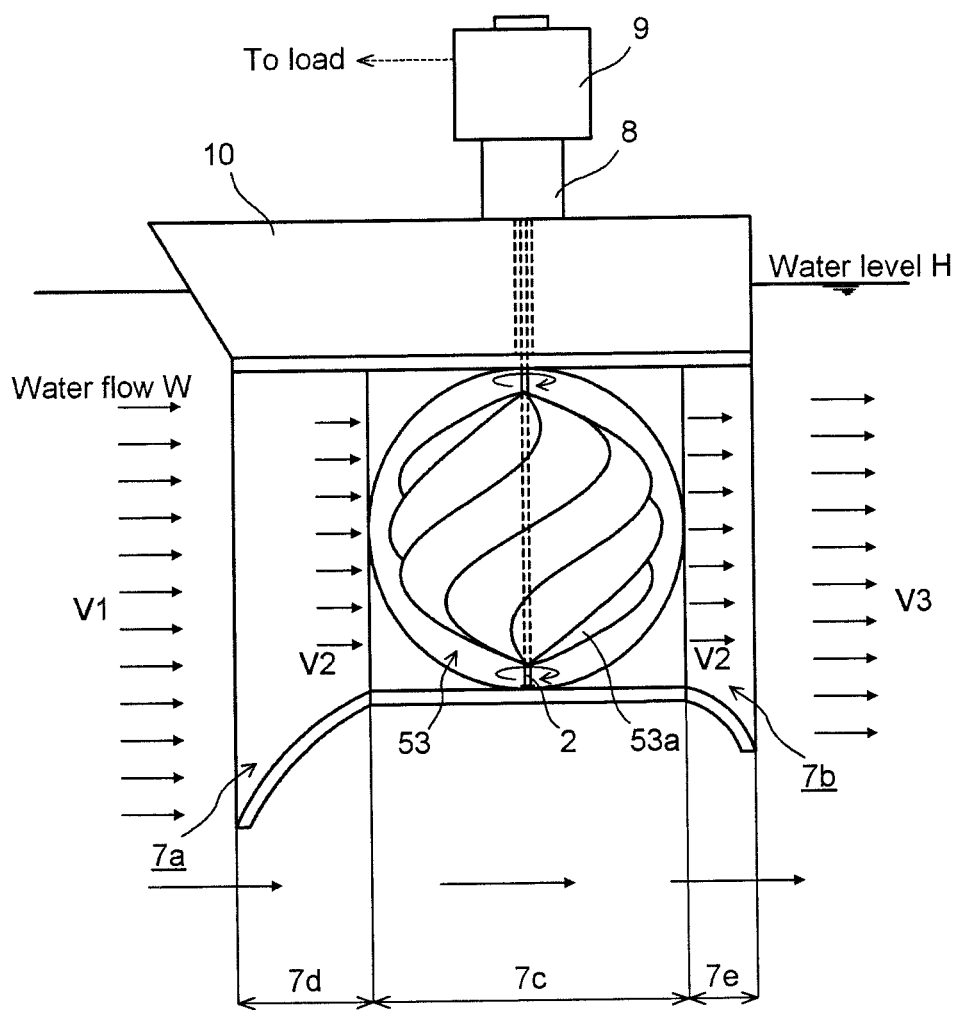
FIG. 20 is a sectional side view of the hydroelectric power device, as seen from the side direction, shown in FIG. 16.

A fourth embodiment of the present invention will be described referring to FIGS. 16 to 20. FIG. 16 is a oblique view of a hydroelectric power device 51 according to a fourth embodiment of the present invention and FIG. 17 is a perspective view of the hydroelectric power device 51. FIG. 18 is a sectional plan view of the hydroelectric power device 51, as seen from the horizontal direction and FIG. 19 is a section view, as seen from the water entry direction, of the hydroelectric power device 51. FIG. 20 is a sectional side view of the hydroelectric power device 51, as seen from the side direction, shown in FIG. 16. In FIGS. 16 to 20, note that the same constituent elements as those of the hydroelectric power device 1 according to the first embodiment shown in FIGS. 1 to 8 are denoted with like numerals, and the description thereof is omitted.

FIGS. 16-20 show another embodiment of the present invention, wherein the hydroelectric power device 51 is comprised of a casing member 57 and a rotor 53 in replace of the casing member 7 and the rotor 3 of the hydroelectric power device 1 according to the first embodiment, respectively.

The rotor 53 may be comprised of a plurality of helical vanes 53a. In the hydroelectric power device 51, shown in FIGS. 18 and 19, the blades 53a are formed in a shape wherein the rotor 53 rotates in the direction where the side of the rotor nearest to the center of the channel rotates with the flow of water, and the side of the rotor nearest to the walls of the channel rotates into, or against, the flow of water, S1 and S2.

As shown in FIGS. 18 and 19, the hydroelectric power device 51 of this embodiment may include baffles 57f that regulate the flow of water inside the channel. Specifically, the baffles 57f are configured as walls that cover half of each of the rotors 53 (a wall that covers the half of the blade portion that is closer to the edge of flow path 7c than the rotating shafts 2 of each of the rotors 53 in the flow path 7c in the casing member 57), in order to prevent reverse rotation of rotors 54. As a result, the rotors 53 can be made to rotate suitably.

In addition, the turbine fan type rotor 53 may be formed such that the width of the vanes 53a, as measured in the radial direction, is gradually shorter as the distance from the center of the rotor, along the axis, is greater, providing a spherical shape to the rotor 53.

As shown in FIGS. 19 and 20, this configuration increases the efficiency of the power generation by providing less vane width, and thus less resistance, at the axial extremities of the rotor 53 where the flow rate of the water within the channel 7c is slowest. Conversely, the vane width is greater in the central portion of the channel 7c wherein the flow rate is fastest.

Fifth Embodiment

This embodiment is a variant of the fourth embodiment. In this embodiment, a cross flow type rotor is used in place of the aforementioned turbine fan type rotor 53. FIGS. 21 through 24 show the summary configuration of a hydroelectric power device having a cross flow type rotor. Note that the same reference numbers are used for constituent elements that are similar or the same.

Figure 21:
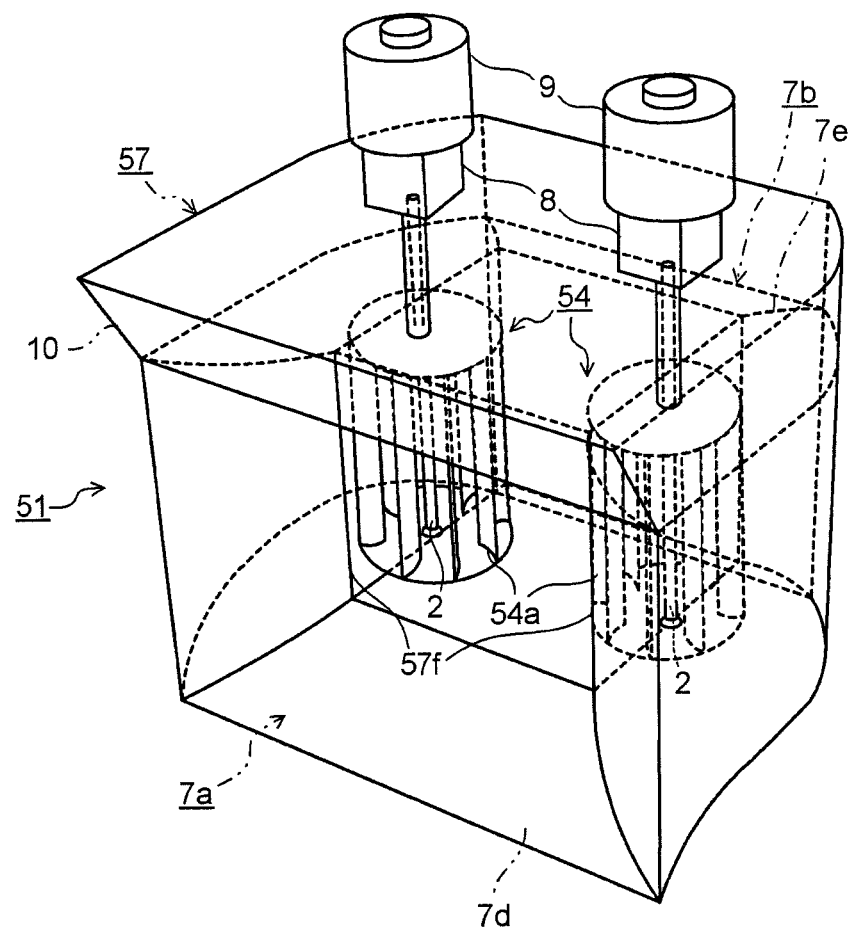
FIG. 21 is a perspective view showing a fifth embodiment of the hydroelectric power device according to the present invention.
Figure 22:
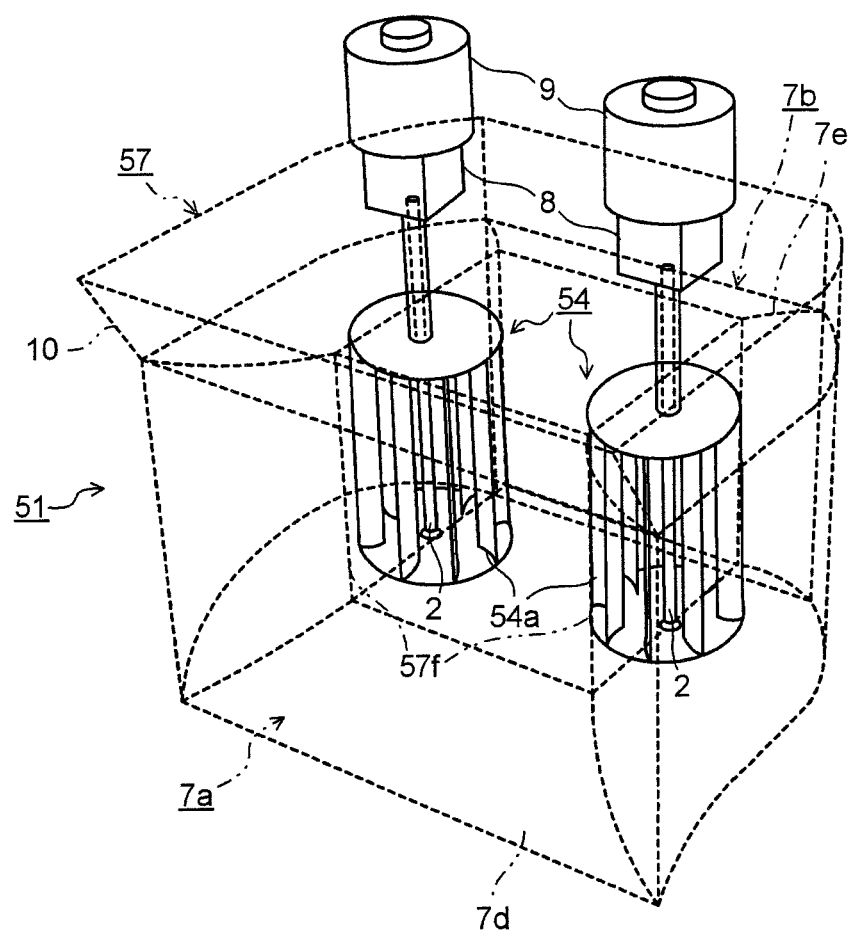
FIG. 22 is a perspective view of the hydroelectric power device shown in FIG. 21.
Figure 23:
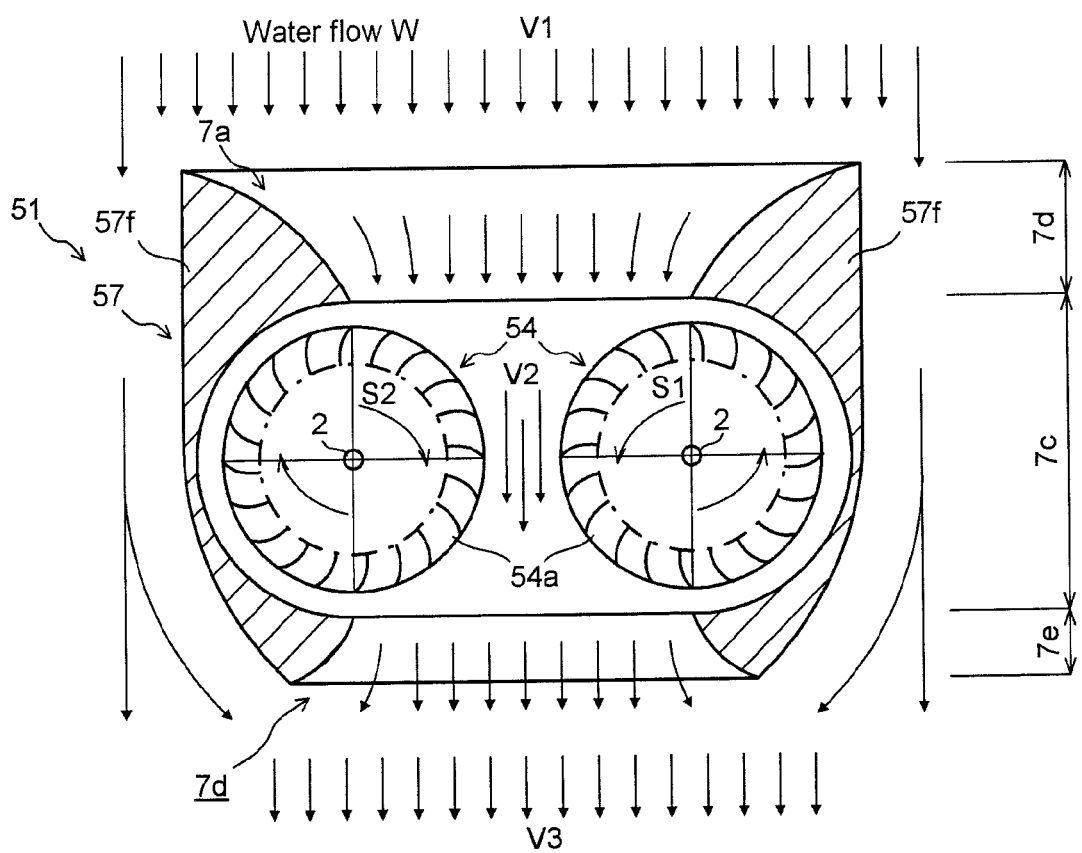
FIG. 23 is a sectional plan view of the hydroelectric power device, as seen from the horizontal direction, shown in FIG. 21.
Figure 24:
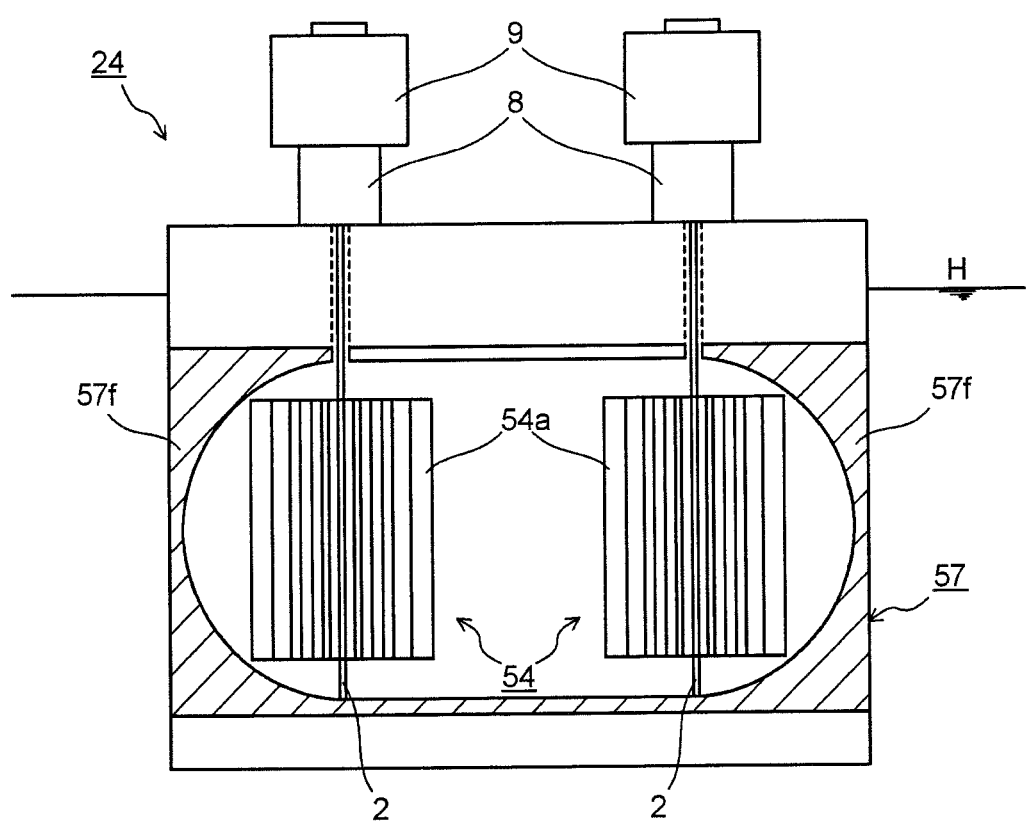
FIG. 24 is a sectional side view, from the water entry direction, of the hydroelectric power device shown in FIG. 21.

FIG. 21 is an oblique view showing a hydroelectric power device 51 according to this embodiment. FIG. 22 is a perspective view of the hydroelectric power device 51. FIG. 23 is a cross-sectional view of the hydroelectric power device 51 viewed from the horizontal direction. FIG. 24 is a cross-sectional view of the hydroelectric power device 51 viewed from the front direction.

In this embodiment, a cross flow type rotor 54 is installed in place of the turbine fan type rotor 53 and blades 54a are formed such that, due to the flow of water passing between the rotating shafts 2 of the pair of rotors 54, the rotor 54 arranged on the right in the drawing rotates in the direction indicated by the arrow S1 and the rotor 54 arranged on the left in the drawing rotates in the direction indicated by the arrow S2.

Moreover, as shown in FIG. 23 and FIG. 24, in the width direction of the water path 7c of the casing member 57, baffles 57f are provided on the casing member 57, where said baffles 57f inhibit (regulate) the flow of water in the water paths closer to the edge of casing member 57 than the rotating shafts 2 of each of the aforementioned rotors. Specifically, the baffles 57f are configured as walls that cover half of each of the rotors 54 (a wall that covers the half of the blade portion that is closer to the edge of flow path 7c than the rotating shafts 2 of each of the rotors 54 in the flow path 7c in the casing member 57), in order to prevent reverse rotation of rotors 54. As a result, the rotors 54 can be made to rotate suitably.

While the invention has been described in connection with certain embodiments, it is not intended to limit the scope of the invention to the particular forms set forth, but, on the contrary, it is intended to cover such alternatives, modifications, and equivalents as may be included within the spirit and scope of the invention as defined by the appended claims.

LEGEND 1, 21, 51 Hydroelectric power device
2 Rotating shaft
3, 23, 33, 43, Rotor 53, 63
3a, 23a, 33a, Blade 43a, 53a, 63a
7, 57 Casing member
7a Water Inlet Opening
7b Water Outlet Opening
7c Channel
7d Tapered Portion
7e Diverging Portion
57f Baffle
63c Through hole

What is claimed is:
1. A hydroelectric power device, comprising:
a float being hollow or constructed of a buoyant material;
a casing member having a water path formed by a channel that passes through the casing member from a water inlet opening on a water entry side of the casing member to a water outlet opening on a water discharge side of the casing member, and wherein the casing member is provided at a bottom side of the float and submerged in water;
rotating shafts located substantially vertically within the casing member and passing through the channel, wherein a top end of each rotating shaft protrudes through the upper surface of the casing member and above the surface of the water through the float;

a rotor with a plurality of rotor blades or vanes positioned within the channel and affixed to each rotating shaft;

a power generator in mechanical communication with each rotating shaft; and a tapered portion located at the water inlet opening on the water entry side of the casing member and having a gradually decreasing width in a water width direction and depth in a water depth direction towards the downstream side, wherein the tapered portion is configured to accelerate water flow at a center of the channel to operate the blades or vanes located between the rotating shafts, thereby rotating the rotary shafts in opposite directions.

2. The device according to claim 1, wherein the casing member further comprising a diverging portion located at the water outlet opening on the water discharge side of the casing member, wherein a cross sectional area of the water path in the diverging portion gradually increases toward the downstream side.

3. The device according to claim 1, wherein a front water volume adjustment plate is disposed in the water inlet opening of the casing member, wherein the front water volume adjustment plate adjusts a volume of water flowing into the casing member.

4. The device according to claim 1, wherein a front water volume adjustment plate is disposed freely rotatably on a connecting part of the water inlet opening such that surface area of an opening on the water entry side can be increased and decreased.

5. The device according to claim 1, further comprising a rear adjustment plate that is disposed in the water outlet opening of the casing member wherein the rear adjustment plate adjusts a volume of water flowing out from the casing member.

6. The device of claim 1, wherein each blade or vane is formed into an airfoil shape, and in a width direction of the water path of the casing member, wherein lift force of the blades or vanes of the rotor obtainable from water flow from the water entry side at a center part in a width direction of the casing member is higher than lift for obtainable from the water flow from the water entry side at an edge side in the width direction of the casing member.

7. The device of claim 1, wherein each blade or vane is formed into an airfoil shape, and in a water depth direction of the water path of the casing member, wherein resistance of the blades or vanes of the rotor receiving water flow from the water entry side at a water surface side or a water bottom side in the water depth direction of the casing member is smaller than resistance of the blades or vanes of the rotor receiving water flow at a center part in a depth direction of the casing member.

8. The device according to claim 1, wherein each blade is formed into an airfoil shape and is perforated with through holes.

9. The device according to claim 1, wherein each rotor is formed such that a width of the vanes, as measured in the radial direction, is gradually shorter as a distance from a center of the rotor, along the axis, is greater in the axial direction, providing a spherical shape to the rotor.

10. The device according to claim 1, wherein the rotor with blades is a turbine fan type rotor, and further comprises baffles inhibiting a flow of water in water paths closer to an edge of casing member than the rotating shafts of each of the rotors.

11. The device according to claim 1, wherein a cross flow type rotor is used for the rotor with blades.

* * * * *